Oct. 9, 1951     E. C. ANDERSON     2,570,420
DEVICE FOR STRAIGHTENING MILK CAN COVERS
Filed May 3, 1948
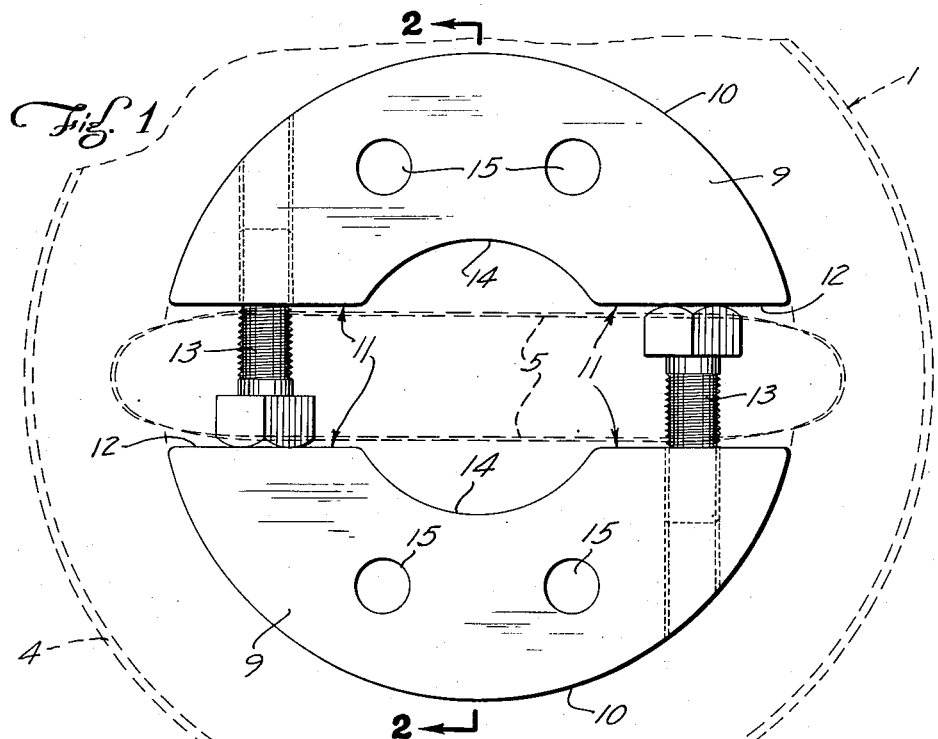
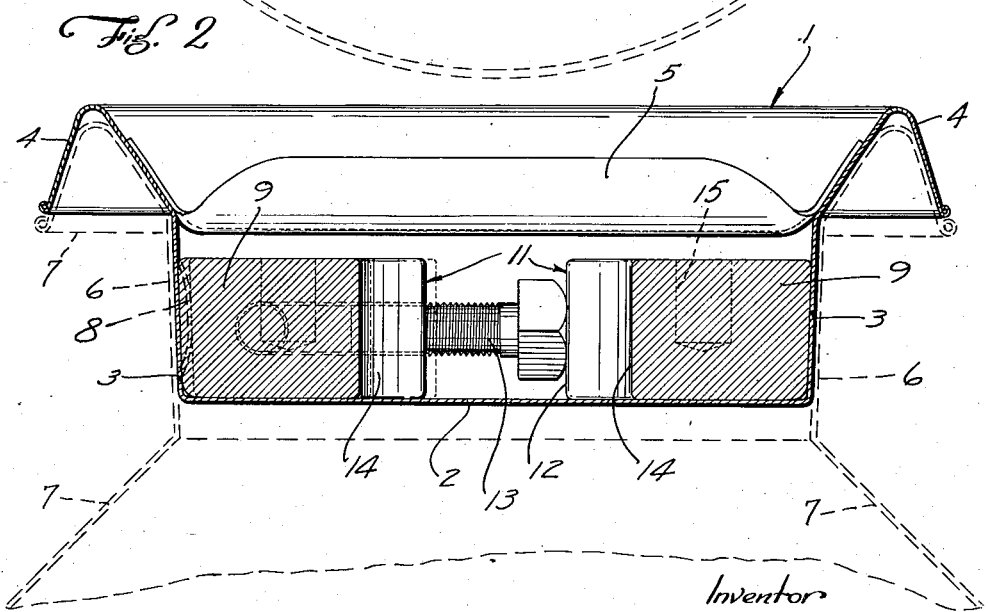
Inventor
EMIL C. ANDERSON
By his Attorneys-
Merchant & Merchant Patented Oct. 9, 1951

2,570,420

UNITED STATES PATENT OFFICE 2,570,420

DEVICE FOR STRAIGHTENING MILK CAN COVERS

Emil C. Anderson, Pine City, Minn.

Application May 3, 1948, Serial No. 24,813

1 Claim. (Cl. 81—15.1)

My invention relates to devices for straightening tubular sections formed from malleable materials, and, more specifically, to a device for straightening peripheral side wall surfaces of milk can covers or the like.

The conventional milk can cover is stamped from malleable sheet metal to provide an upwardly-opening cup, the side walls of which are adapted to make sealing contact with the neck of a milk can. These side walls frequently become dented or otherwise damaged due to rough handling, and are thereby rendered unusable. Heretofore, there has been no satisfactory device for taking up dents and otherwise truing up the tubular sealing side walls of the can so as to again render it usable. This is due largely to the fact that the cover is also provided with a diametrically-extended handle which is spaced upwardly from the bottom of the cover, at approximately the top of the sealing side wall. In other words, heretofore there has been no device which could be readily inserted into the space below the handle and which could thereafter be expanded with sufficient force to restore a true round condition to the sealing side walls of the cover. The primary object of my invention is the provision of a device which is inexpensive to manufacture, which is relatively light in weight, and which may be readily inserted into a milk can cover below the handle portion thereof.

A further object of my invention is the provision of a device which may also be utilized in the straightening of the necks of milk cans or other tubular portions formed from malleable sheet material.

Still another object of my invention is the provision of structure as set forth which is rigid in construction and efficient and durable in use.

The above and other highly important objects and advantages of my invention will become apparent from the following specification, claim, and attached drawings.

Referring to the drawings, in which like characters refer to like parts throughout the several views:

Fig. 1 is a view in plan of my device inserted below the handle of a milk can cover, the milk can cover being shown by dotted lines; and Fig. 2 is a view in section taken on the line 2—2 of Fig. 1, the milk can cover thereof being rotated ninety degrees relative to its position in Fig. 1.

Referring with greater particularity to the drawings, the numeral 1 indicates in an entirety a milk can cover comprising a bottom 2, a tubular side wall 3 which is slightly diverging in an upward direction and which terminates in an annular cross-sectionally-inverted V-shaped flange 4. A handle 5 extends diametrically of the cover 1 at approximately the top of the tubular side wall 3 and is welded or otherwise secured to the flange 4 at its opposite ends. The slight upward divergence or taper of the tubular side wall 3 is identical to the outward taper of the neck 6 of a milk can 7 illustrated in Fig. 2 by dotted lines. The tubular side wall 3 is of a size to nest snugly in the neck 6 of the milk can 7, and forms sealing contact therewith.

During the handling of milk cans and the covers therefor, the sealing side walls 3 of the covers frequently become dented, such a dent being shown by dotted lines in Fig. 2 and designated by the numeral 8, often destroying the sealing engagement between the tubular side wall 3 and the neck 6 of the can 7. To smooth or straighten out these dents, I provide a pair of segmental die blocks 9 which may be made of any suitable material, such as cast iron or the like, and the peripheral working surfaces 10 of which correspond to the arc of the sealing side walls 3 of the cover 1. The die blocks 9 are of a thickness slightly less than the height of the sealing side walls 3 and have a segmental width less than the width of a segment defined by the side edges of the handle 5 and the side walls 3, so that the die blocks 9 may be easily inserted into the cover 1. The chordal surfaces 11 of the die blocks 9 form fixed abutments 12 adjacent one end of each thereof. I provide adjustable abutments in the nature of headed bolts or the like 13 having threaded engagement with the die blocks 9, and which extend in a plane perpendicular to the planes of the chordal surfaces 11 adjacent the end thereof opposite the fixed abutment 12. Segmental notches 14 are formed in each of the die blocks 9 centrally of the chordal surfaces 11 to further facilitate insertion of the die blocks in the cover 1. As shown in Fig. 1, the heads of each of the bolts 13 bear against an opposed fixed abutment 12.

I further provide in each die block 9 a pair of spaced axially-extended finger-receiving apertures 15 which may be used when removing the die blocks 9 from the cover 1.

When it is desired to straighten out or true a dent as indicated at 8, the screws 13 are threaded into the die blocks 9 as far as is necessary to allow the die blocks 9 to be inserted into the cover 1. When both of the die blocks 9 are positioned in the cover 1, the screws 13 are turned so as to move outwardly of their respective die blocks 9 toward the opposing abutment 12 of the other die block 9. The screws 13 may be turned simultaneously or alternately as desired, whereby to force the die blocks 9 progressively further apart until the dent 8 is smoothened out and a true cross-sectionally tubular side wall 3 is again obtained, as shown.

It will be seen by reference to Fig. 1 that when the die blocks are inserted into the cover 1, the chordal surfaces 11 of the die blocks are substantially parallel to the handle 5. Before turning the screws 13, however, it is necessary to rotate the die blocks 9 within the cover 1 to a point where the heads of the screws 13 may be accessible to a wrench or the like.

Dents may be removed from the neck 6 of the milk can 7 in the same manner as those of the milk can cover 1. When straightening the neck 6, it has been found to be more easily accomplished if the milk can 7 is disposed on its side so that the die blocks 9 may be inserted into the neck 6 with the screws 13 disposed in an axially vertical position.

I have also found that my novel device has utility in the stretching of milk can covers to conform to the necks of milk cans which have become unduly enlarged from long and continued use.

Furthermore, while I have shown adjustable means for moving the die blocks radially outwardly with respect to each other, it should be obvious that other means for expanding the die blocks, such as cam or fluid pressure-operated means, may be substituted therefor with equally effective results.

My device has been thoroughly tested and found to be entirely adequate for the accomplishment of the objectives set forth, and while I have shown a preferred embodiment of my invention, it will be understood that the same is capable of modification without departure from the scope and spirit of the invention as defined in the claim.

What I claim is:

In a device for straightening the side walls of receptacle covers having an upwardly-opening cup-shaped body and a diametrically-extended handle spaced from the bottom of said body, said device comprising a pair of segmental die blocks having smooth and continuous peripheral working faces the arc of which corresponds approximately to the arc of the sealing side walls of said cover below the handle, said die blocks having a segmental width less than the width of the segment defined by the opposite side edges of said handle and said sealing side walls whereby to permit passage of said blocks between the side edges of said handle and the side walls of said cover, said die blocks having a thickness less than the distance between the bottom of the handle and the bottom of the cup-shaped body, whereby said die blocks may be rotated within said body; the chordal surfaces of each of said die blocks being provided with an adjustment bolt adjacent one end thereof, the adjustment bolt of each block being adapted to engage the chordal surface of the other of said die blocks adjacent the opposite end thereof, the chordal surfaces of both of said die blocks being provided with central segmental notches, and each of said die blocks being provided with spaced axially-extending finger-receiving apertures.

EMIL C. ANDERSON.

REFERENCES CITED

The following references are of record in the file of this patent:

UNITED STATES PATENTS

| Number | Name | Date |
| --- | --- | --- |
| 1,000,818 | Kempf | Aug. 15, 1911 |
| 1,472,915 | Klein | Nov. 6, 1923 |
| 2,453,797 | Johnson | Nov. 16, 1948 |